United States Patent
Parekh (10) Patent No.: US 10,909,542 B2
(45) Date of Patent: Feb. 2, 2021

(54) PAYMENT FACILITATION METHOD AND SYSTEM

(71) Applicant: MASTERCARD INTERNATIONAL INCORPORATED, Purchase, NY (US)

(72) Inventor: Pravin Parekh, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 182 days.

(21) Appl. No.: 15/724,832

(22) Filed: Oct. 4, 2017

(65) Prior Publication Data

US 2018/0096352 A1 Apr. 5, 2018

(30) Foreign Application Priority Data

Oct. 5, 2016 (SG) ............................ 10201608366R (51) Int. Cl.
*G06Q 20/38* (2012.01)
*G06Q 20/40* (2012.01)
*G06Q 20/32* (2012.01)

(52) U.S. Cl.
CPC ....... *G06Q 20/405* (2013.01); *G06Q 20/3223* (2013.01); *G06Q 20/3224* (2013.01); *G06Q 20/388* (2013.01)

(58) Field of Classification Search
None
See application file for complete search history.

(56) References Cited

U.S. PATENT DOCUMENTS

| | | | | |
|---|---|---|---|---|
| 2011/0238517 | A1* | 9/2011 | Ramalingam | G06Q 20/40 705/26.1 |
| 2013/0132274 | A1* | 5/2013 | Henderson | G06Q 20/4012 705/41 |
| 2014/0012688 | A1* | 1/2014 | McGuinness | H04W 4/021 705/16 |
| 2015/0006271 | A1* | 1/2015 | Oppenheim | G06Q 30/06 705/14.23 |
| 2015/0088673 | A1* | 3/2015 | Higgins, Sr. | G06Q 20/12 705/16 |
| 2016/0034900 | A1* | 2/2016 | Nelsen | G06Q 20/4016 705/44 |
| 2016/0086217 | A1* | 3/2016 | Loomis | G06F 16/22 705/14.51 |
| 2016/0210634 | A1* | 7/2016 | Trujillo | G06Q 20/20 |
| 2017/0004487 | A1* | 1/2017 | Hagen | G06O 20/4016 |

OTHER PUBLICATIONS

Mandyam, G., et al.. (2015) in "Leveraging Contextual Data for Multifactor Authentication in the Mobile Web," from Future Information Security Workshop, COMSNETS 2015. (Year: 2015).*

* cited by examiner

*Primary Examiner* — Olabode Akintola
*Assistant Examiner* — Brandon M Duck
(74) *Attorney, Agent, or Firm* — Harness, Dickey & Pierce, P.L.C.

(57) ABSTRACT

There is provided a method and system for facilitating a payment from a customer to a merchant, and a client device for facilitating a payment from a customer to a merchant. The various aspects rely on use of a merchant identifier based on a client device geolocation.

18 Claims, 7 Drawing Sheets

PAYMENT FACILITATION METHOD AND SYSTEM

CROSS-REFERENCE TO RELATED APPLICATION

This application claims the benefit of and priority to Singapore Patent Application No. 10201608366R filed Oct. 5, 2016. The entire disclosure of the above application is incorporated herein by reference.

FIELD

This present disclosure relates to methods and systems for facilitating a payment from a customer to a merchant, being particularly suitable for facilitating a cashless payment from a customer to a merchant that does not have a card acquiring infrastructure.

BACKGROUND

This section provides background information related to the present disclosure which is not necessarily prior art.

Card payments using credit cards or debit cards are becoming increasingly preferred by customers compared to cash when purchasing goods or services from a merchant. In order to facilitate card payments, a merchant will generally need to have a suitable card acquiring infrastructure, such as a point of sale (POS) terminal, installed in their place of business.

However, if a merchant cannot afford to install a card acquiring infrastructure, then the merchant may be unable to accept cashless payments, which could cause the merchant to miss out on potential sales.

Mobile payment services may allow customers to make cashless payments using a portable mobile device, such as a smart phone, although the most widely adopted implementations still rely on a conventional card acquiring infrastructure or more specialised supporting infrastructure, such as Near Field Communication (NFC) readers. Accordingly, mobile payment services have not removed the need for the merchant to have an infrastructure.

It would therefore be desirable to provide a solution for facilitating a cashless payment from a customer to a merchant that does not have a card acquiring infrastructure.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

This section provides a general summary of the disclosure, and is not a comprehensive disclosure of its full scope or all of its features. Aspects and embodiments of the disclosure are set out in the accompanying claims.

In a first aspect, there is provided a method for facilitating a payment from a customer to a merchant, the method being performed using one or more electronic processing devices, the method including: (a) receiving, from a client device of the customer, a client device geolocation; (b) determining a merchant identifier of the merchant based on the client device geolocation; (c) providing, to the client device, merchant details based on the merchant identifier; (d) receiving, from the client device, a payment authorization for the merchant including: (i) an indication of a payment instrument of the customer; and (ii) a payment amount for the payment; and (e) causing the payment from the payment instrument of the customer to the merchant to be performed in accordance with the payment authorization.

Preferably, determining the merchant identifier based on the client device geolocation includes selecting the merchant identifier from a plurality of merchant identifiers each corresponding to a respective merchant geolocation based on a comparison between the client device geolocation and the respective merchant geolocations.

Selecting the merchant identifier from a plurality of merchant identifiers can preferably include determining the respective merchant geolocation that is closest to the client device geolocation or determining whether the client device geolocation is within a distance threshold of any of the respective merchant geolocations.

It is preferable that if the client device geolocation is within the distance threshold of more than one merchant geolocation, the method includes: (a) providing, to the client device, the merchant details for each merchant identifier corresponding to the more than one merchant geolocations; and (b) receiving, from the client device, a merchant selection based on the merchant details.

The merchant details and the respective merchant geolocation for each of the plurality of merchants are preferably stored in a database.

It is preferable that the merchant details include at least an identity of the merchant to thereby allow the customer to confirm the identity of the merchant before authorizing the payment.

The method can preferably include receiving the payment authorization in response to manual input by the customer using the client device; and can include the customer manually inputting a selection of the payment instrument from a plurality of available payment instruments.

It is preferable that the method includes the customer manually inputting the payment amount using the client device, and includes the merchant confirming the payment amount to the customer prior to the customer manually inputting the payment amount.

Preferably, causing the payment to be performed includes: (a) determining a customer account based on the indication of the payment instrument; (b) determining a merchant account based on the merchant identifier; and (c) causing the customer account to be debited and the merchant account to be credited in accordance with the payment authorization.

It is preferable that causing the payment to be performed includes generating a payment request message and providing the payment request message to a payment server.

Preferably, the method includes, in response to a successful payment, providing a successful payment notification to a client device of the merchant.

The method can preferably include generating the successful payment notification with a unique reference to allow the merchant to confirm that the payment has been received from the customer.

It is preferable that the method includes the one or more electronic processing devices communicating with the client device using a communication network.

In another aspect, there is provided a system for facilitating a payment from a customer to a merchant, the system including one or more electronic processing devices configured to: (a) receive, from a client device of the customer, a client device geolocation; (b) determine a merchant identifier of the merchant based on the client device geolocation;

(c) provide, to the client device, merchant details based on the merchant identifier; (d) receive, from the client device, a payment authorization for the merchant including: (i) an indication of a payment instrument of the customer; and (ii) a payment amount for the payment; and (e) cause the payment from the payment instrument of the customer to the merchant to be performed in accordance with the payment authorization.

In another aspect, there is provided a method for facilitating a payment from a customer to a merchant, the method being performed using a client device of the customer, the method including: (a) determining a client device geolocation; (b) providing, to an application server, the client device geolocation to thereby allow the application server to determine a merchant identifier of the merchant based on the client device geolocation; (c) receiving, from the application server, merchant details based on the merchant identifier; (d) obtaining a payment authorization for the merchant including: (i) an indication of a payment instrument of the customer; and (ii) a payment amount for the payment; and (e) providing the payment authorization to the application server to thereby allow the application server to cause the payment from the payment instrument of the customer to the merchant to be performed in accordance with the payment authorization.

In a final aspect, there is provided a client device for facilitating a payment from a customer to a merchant, the client device being configured to: (a) determine a client device geolocation; (b) provide, to an application server, the client device geolocation to thereby allow the application server to determine a merchant identifier of the merchant based on the client device geolocation; (c) receive, from the application server, merchant details for the merchant; (d) provide, to the application server, a payment authorization for the merchant including: (i) an indication of a payment instrument of the customer; and (ii) a payment amount for the payment, to thereby allow the application server to cause the payment from the payment instrument of the customer to the merchant to be performed in accordance with the payment authorization.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. An example of the present disclosure will now be described with reference to the accompanying drawings, in which.

Corresponding reference numerals indicate corresponding parts throughout the several views of the drawings.

DETAILED DESCRIPTION

Embodiments of the present disclosure, again, will be described, by way of example only, with reference to the drawings. The description and specific examples included herein are intended for purposes of illustration only and are not intended to limit the scope of the present disclosure.

An example of a method for facilitating a payment from a customer to a merchant will now be described with reference to FIG. 1.

Figure 1:
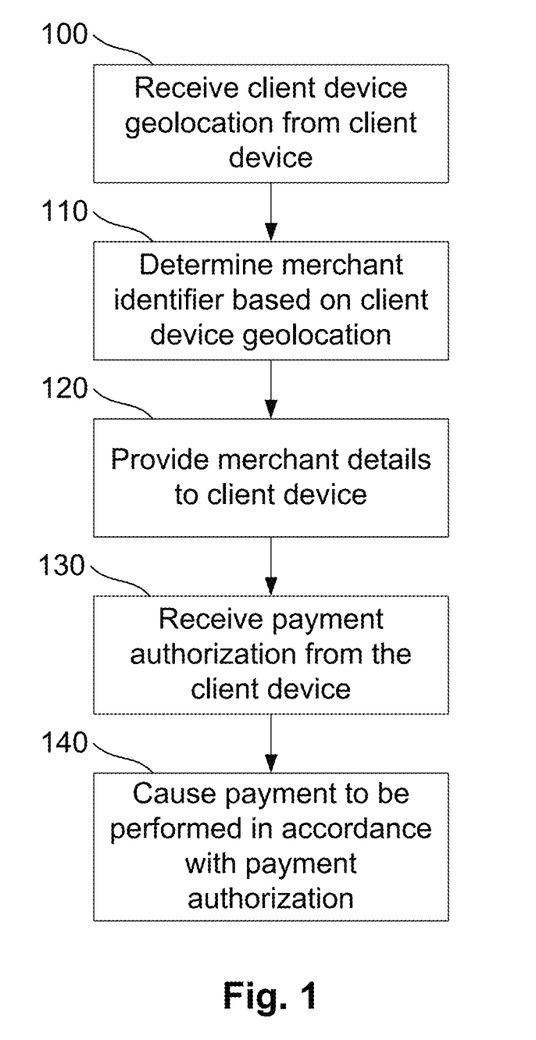
FIG. 1 is a flow chart of an example of a method for facilitating a payment from a customer to a merchant.

The method, as exemplified in FIG. 1, is performed using one or more electronic processing devices, which will be referred to as an application server for the purpose of this example. The application server will be configured to communicate with a client device of the customer, which will be in the form of another electronic processing device. The application server may communicate with the client device using a communication network.

In this example, it will be assumed that the client device may be a suitably configured mobile device, such as a smart phone. The client device will typically execute application software for enabling the communication with the application server and enabling functionalities of the method. Suitable examples of electronic processing devices for providing the application server and the client device will be described in more detail below.

Step 100 of the method involves receiving, from the client device of the customer, a client device geolocation. Accordingly, it will be appreciated that the client device should have geolocation capabilities for allowing the client device geolocation to be determined and provided to the application server. This initial step may occur, for example, when the customer opens the application software on the client device, such as to initiate a payment to a merchant after selecting goods or services for purchase in the merchant's place of business.

At step 110, a merchant identifier of the merchant is determined based on the client device geolocation. This may involve selecting the merchant identifier from a plurality of merchant identifiers each corresponding to a respective merchant geolocation based on a comparison between the client device geolocation and the respective merchant geolocations. For example, the application server may include a database storing the respective merchant geolocation for each merchant to enable the comparison.

In some implementations, the selection of the merchant identifier may involve determining the respective merchant geolocation that is closest to the client device geolocation, and selecting the corresponding merchant. Alternative implementations may involve determining whether the client device geolocation is within a distance threshold of any of the respective merchant geolocations, which may help to account for inaccuracy of the geolocation information, which may prevent definitive determination of the merchant especially in locations such as marketplaces having a high density of merchants. In such implementations, if the client device geolocation is within the distance threshold of more than one merchant geolocations, this may be resolved by having the application server provide the client device with merchant details for each merchant corresponding to the more than one merchant geolocations, so that the customer can make a merchant selection based on the merchant details, which can be returned from the client device to the application server.

In any event, once the merchant identifier has been determined, the merchant details for the merchant are provided to the client device in step 120. For example, the above mentioned database of the application server may store the merchant details for each merchant in addition to the respective merchant geolocations, and the merchant details for the selected merchant may be transferred to the client device and displayed on a display of the client device. Providing the merchant details to the client device will allow the customer to confirm that the payment will be made to the correct merchant. In some implementations, the merchant details may include an identity of the merchant to thereby allow the customer to confirm the identity of the merchant before authorizing the payment.

Assuming the customer wishes to proceed by making a payment to the merchant corresponding to the merchant details provided to the client device, the customer may then authorize the payment. The payment authorization for the merchant is received from the client device at step 130. The payment authorization will generally include an indication of a payment instrument of the customer and a payment amount for the payment.

In some implementations, the payment authorization may be received in response to manual input by the customer using the client device. For instance, the customer may manually input a selection of the payment instrument from a plurality of available payment instruments to authorize a payment from that payment instrument. The customer may also manually input the payment amount using the client device to thereby authorize a payment of that payment amount. Allowing the customer to manually input the payment amount avoids the need for the merchant to have any infrastructure for facilitating the payment. The merchant may simply confirm the payment amount to the customer prior to the customer manually inputting the payment amount, without requiring a POS terminal, or the like. The merchant could confirm the payment amount verbally or by using a cash register display, or the like. In any event, the customer can obtain the payment amount from the merchant and input this amount using the client device as part of the payment authorization.

Following receipt of the payment authorization, step 140 of the method involves causing the payment from the payment instrument of the customer to the merchant to be performed in accordance with the payment authorization. The payment may then be performed using conventional payment techniques, such as by using a payment instrument token stored in a mobile wallet of the customer.

In some examples, the step of causing the payment to be performed may include determining a customer account based on the indication of the payment instrument receiving the payment authorization received in step 130, determining a merchant account based on the merchant identifier determined in step 110, and causing the customer account to be debited and the merchant account to be credited in accordance with the payment authorization.

In some implementations, the application server may cause the payment to be performed by generating a payment request message (including, for instance, the payment amount, the customer account and the merchant account as discussed above) and providing the payment request message to a payment server of a payment service provider, or the like. The payment server can then perform the payment based on the payment request message in a generally conventional manner.

In any event, it will be appreciated that the above method can allow a payment from the customer to the merchant to be facilitated without requiring the merchant to have any card acquiring infrastructure. The merchant can simply inform the customer of the payment amount and the rest of the payment process will involve the customer, the client device, the application server and payment service provider. In some implementations, the merchant may not need to play any part in the payment process whatsoever, for instance in a customer self-service scenario.

Nevertheless, the method may also include providing a successful payment notification to a client device of the merchant in response to a successful payment. Accordingly, the merchant can be assured that the payment has been received before providing goods or services to the customer and completing the transaction. It should be noted, however, that the merchant's client device does not need to be involved in any other part of the payment process described above. The successful payment notification is merely provided for confirmation purposes, since the merchant does not have any equipment that communicates with the customer's client device or the application server as the payment is being facilitated.

In some implementations, the successful payment notification may be generated with a unique reference to allow the merchant to confirm that the payment has been received from the customer. For instance, the merchant may provide the unique reference to the application server using application software executed on the merchant's client device or a web interface to query the status of the corresponding payment, to thereby cross-check that the payment has indeed been successfully performed.

In view of the above, it will be appreciated that a suitable system for facilitating a payment from a customer to a merchant will include one or more electronic processing devices. These will be configured to receive, from a client device of the customer, a client device geolocation, determine a merchant identifier of the merchant based on the client device geolocation, and provide merchant details based on the merchant identifier to the client device. The one or more electronic processing devices will be configured to receive, from the client device, a payment authorization for the merchant including an indication of a payment instrument of the customer and a payment amount for the payment and then cause the payment from the payment instrument of the customer to the merchant to be performed in accordance with the payment authorization.

From the perspective of the client device, an example implementation of the method may involve the following steps. The client device will first determine a client device geolocation, and provide this to an application server to thereby allow the application server to determine the merchant identifier based on the client device geolocation. Then, the client device will receive merchant details based on the merchant identifier from the application server. The client device will then obtain a payment authorization for the merchant including an indication of a payment instrument of the customer and a payment amount for the payment. This is typically obtained by manual input from the customer using the client device. Finally, the client device will provide the payment authorization to the application server to thereby allow the application server to cause the payment from the payment instrument of the customer to the merchant to be performed in accordance with the payment authorization.

In one example, the process is performed by one or more processing systems operating as part of a distributed architecture, an example of which will now be described with reference to FIG. 2.

In this example, the arrangement includes a number of processing system 201, 203 interconnected via one or more communications networks, such as the Internet 202, and/or a number of local area networks (LANs) 204. It will be appreciated that the configuration of the networks 202, 204 are for the purpose of example only, and in practice the processing systems 201, 203 can communicate via any appropriate mechanism, such as via wired or wireless connections, including, but not limited to mobile networks, private networks, such as 802.11 networks, the Internet, LANs, WANs, or the like, as well as via direct or point-to-point connections, such as Bluetooth®, or the like.

The nature of the processing systems 201, 203 and their functionality will vary depending on their particular requirements. In one particular example, the processing systems 201, 203 represent servers and clients, although this is not essential and is used primarily for the purpose of illustration.

Figure 3:
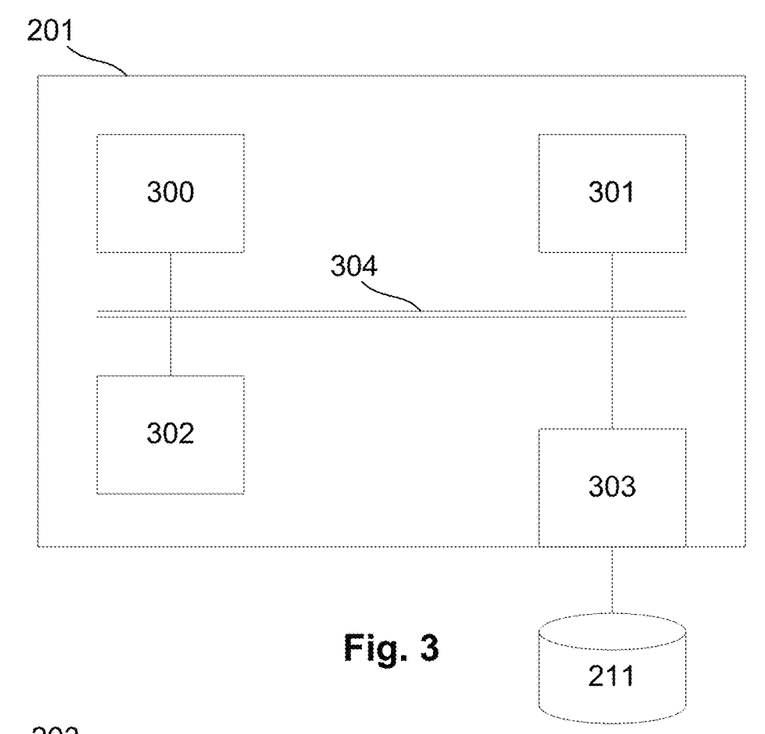
FIG. 3 is a schematic diagram of an example of a server processing system.

An example of a suitable processing system 201 is shown in FIG. 3. In this example, the processing system 201 includes an electronic processing device, such as at least one microprocessor 300, a memory 301, an optional input/output device 302, such as a keyboard and/or display, and an external interface 303, interconnected via a bus 304 as shown. In this example the external interface 303 can be utilised for connecting the processing system 201 to peripheral devices, such as the communications networks 202, 204, databases 211, other storage devices, or the like. Although a single external interface 303 is shown, this is for the purpose of example only, and in practice multiple interfaces using various methods (e.g., Ethernet, serial, USB, wireless, or the like) may be provided.

In use, the microprocessor 300 executes instructions in the form of applications software stored in the memory 301 to perform required processes, such as communicating with other processing systems 201, 203. Thus, actions performed by a processing system 201 are performed by the processor 300 in accordance with instructions stored as applications software in the memory 301 and/or input commands received via the I/O device 302, or commands received from other processing systems 201, 203. The applications software may include one or more software modules, and may be executed in a suitable execution environment, such as an operating system environment, or the like.

Accordingly, it will be appreciated that the processing systems 201 may be formed from any suitable processing system, such as a suitably programmed computer system, PC, web server, network server, or the like. In one particular example, the processing system 201 is a standard processing system, such as a 32-bit or 64-bit Intel® Architecture based processing system, which executes software applications stored on non-volatile (e.g., hard disk) storage, although this is not essential. However, it will also be understood that the processing systems 201 could be or could include any electronic processing device, such as a microprocessor, microchip processor, logic gate configuration, firmware optionally associated with implementing logic, such as an FPGA (Field Programmable Gate Array), or any other electronic device, system or arrangement.

Figure 4:
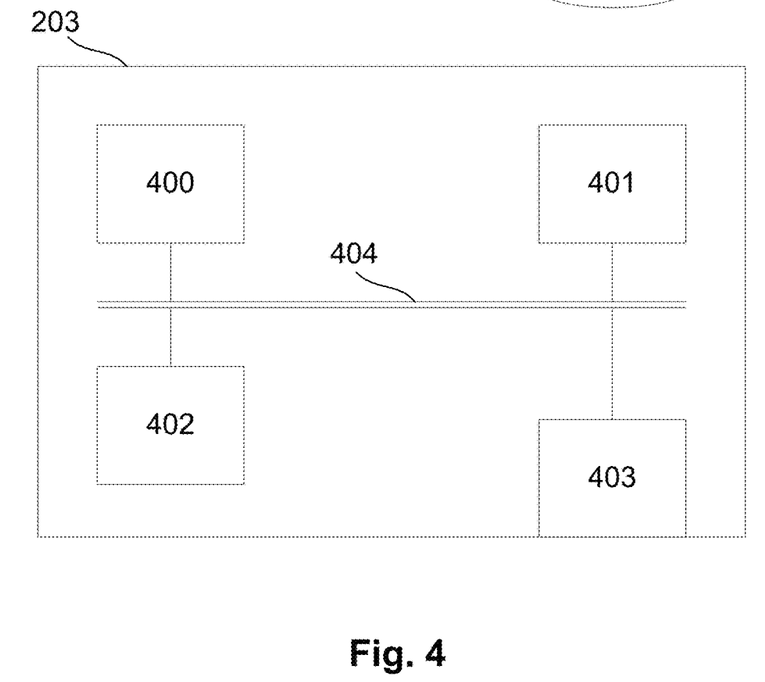
FIG. 4 is a schematic diagram of an example of a client processing system.

As shown in FIG. 4, in one example, the processing systems 203 include an electronic processing device, such as at least one microprocessor 400, a memory 401, an input/output device 402, such as a keyboard and/or display, and an external interface 403, interconnected via a bus 404, as shown. In this example the external interface 403 can be utilised for connecting the processing system 203 to peripheral devices, such as the communications networks 202, 204, databases, other storage devices, or the like. Although a single external interface 403 is shown, this is for the purpose of example only, and in practice multiple interfaces using various methods (e.g., Ethernet, serial, USB, wireless, or the like) may be provided.

In use, the microprocessor 400 executes instructions in the form of applications software stored in the memory 401 to perform required processes, for example, to allow communication with other processing systems 201, 203. Thus, actions performed by a processing system 203 are performed by the processor 400 in accordance with instructions stored as applications software in the memory 401 and/or input commands received from a user via the I/O device 402. The applications software may include one or more software modules, and may be executed in a suitable execution environment, such as an operating system environment, or the like.

Accordingly, it will be appreciated that the processing systems 203 may be formed from any suitable processing system, such as a suitably programmed PC, Internet terminal, lap-top, hand-held PC, smart phone, PDA, tablet, or the like. Thus, in one example, the processing system 203 is a standard processing system, such as a 32-bit or 64-bit Intel® Architecture based processing system, which executes software applications stored on non-volatile (e.g., hard disk) storage, although this is not essential. However, it will also be understood that the processing systems 203 can be any electronic processing device, such as a microprocessor, microchip processor, logic gate configuration, firmware optionally associated with implementing logic such as an FPGA (Field Programmable Gate Array), or any other electronic device, system or arrangement.

It will also be noted that whilst the processing systems 201, 203 are shown as single entities, it will be appreciated that this is not essential, and instead one or more of the processing systems 201, 203 can be distributed over geographically separate locations, for example, by using processing systems provided as part of a cloud based environment.

For the purpose of the following detailed examples, it is assumed that the client devices used by the customers and the merchants will each be provided by processing systems 203 executing suitable application software. Furthermore, it is assumed that the client devices carried by the customers are capable of determining their geolocation, for instance, by using a global positioning system (GPS) receiver or cell tower triangulation.

The process may be facilitated by one or more of the processing systems 201, acting as application servers. Other processing systems 201 may act as payment servers operated by payment service providers, financial institutions, or the like. The payment servers will be responsible for actually performing the payments in a conventional manner, once the payments have been facilitated by the application servers in accordance with the method.

Figure 2:
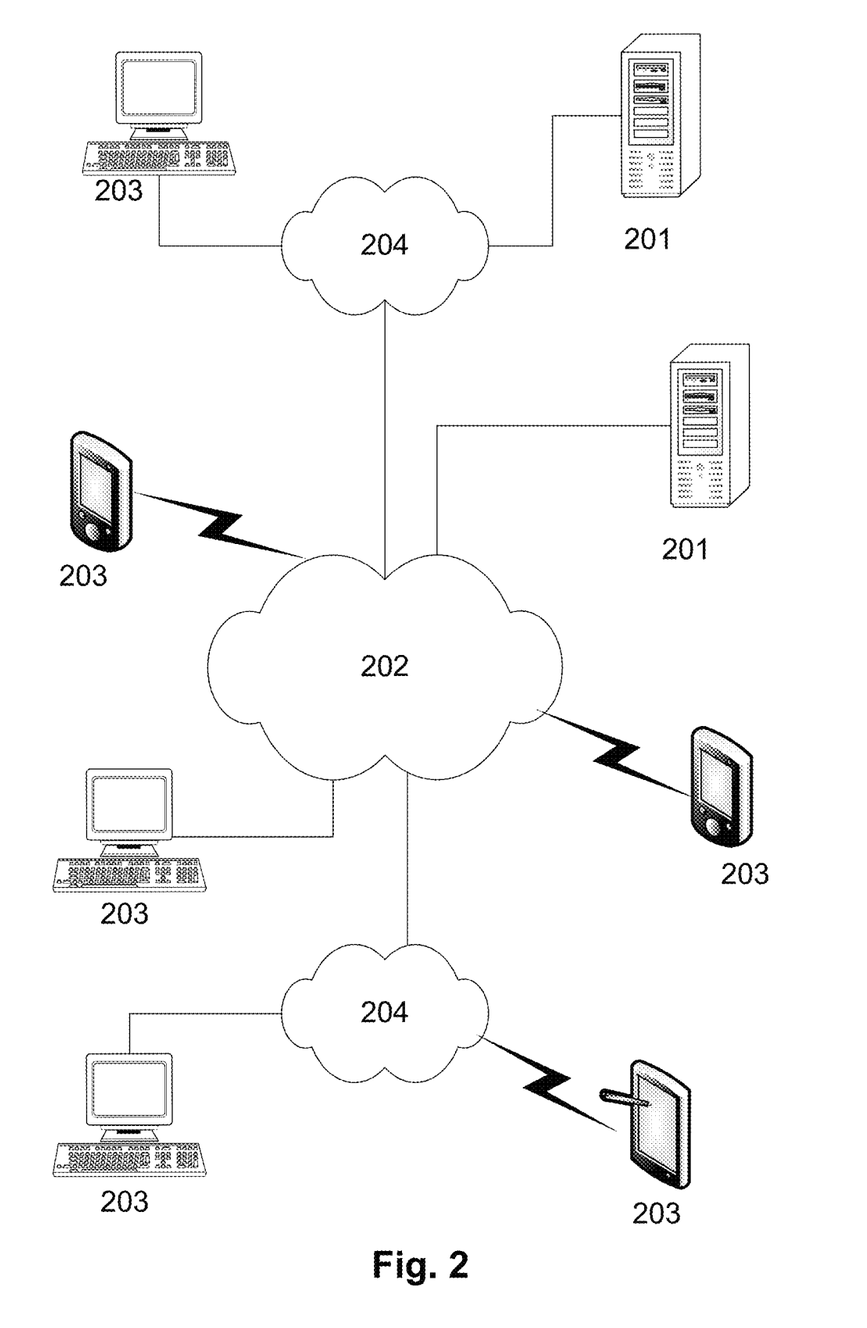
FIG. 2 is a schematic diagram of an example of a distributed computer architecture.

As depicted in FIG. 2, the processing systems 201 acting as application servers and/or payment servers and processing systems 203 acting as client devices and merchant devices may be connected to communications networks 202, 204 in different configurations, to allow communication between the different processing systems 201, 203 via the Internet 202.

Figure 5:
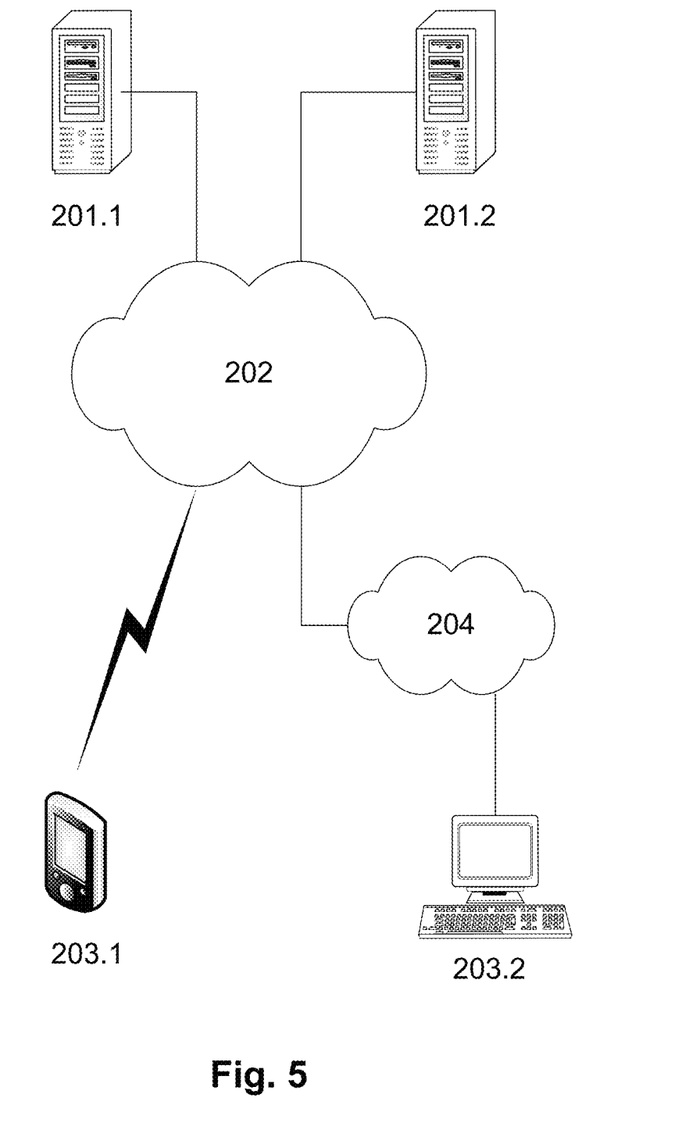
FIG. 5 is a schematic diagram of an example of a system configuration for facilitating a payment from a customer to a merchant.

A particular example of a system configuration for facilitating a payment from the customer to the merchant, which is assumed to be used in the following detailed example, will now be described with regard to FIG. 5.

In this example, the customer uses a client device 203.1 in the form of a smartphone, which includes a GPS receiver for allowing the geolocation of the client device 203.1 to be determined. However, in the event that a GPS signal is unavailable, the client device 203.1 will be able to determine an approximate geolocation using cell tower triangulation or any other suitable geolocation capability of the client device 203.1. Typically the client device 203.1 will also be configured to connect to the Internet 202. In this case, the client device 203.1 of the customer wirelessly connects to the Internet 202 and has a data plan on a mobile network for allowing the consumption of mobile data via the Internet 202.

The client device 203.1 will typically execute application software for enabling the functionalities required to perform the method. The customer will interact with their client device 203.1 to open the application software for initiating a payment and to authorize the payment by selecting a payment instrument and inputting a payment amount. The customer may also interact with the client device 203.1 to perform other tasks, such as selecting the merchant identifier in the event that a single merchant identifier cannot be determined based on the geolocation of the client device 203.1 or to receive payment notifications.

The merchant may also use a client device 203.2, such as to receive payment notifications or to confirm that a payment from a customer has been processed. The merchant's client device 203.2 will be referred to as a merchant device 203.2 to distinguish this from the customer's client device 203.1. However it should be appreciated that the merchant does not require a POS terminal or any supporting infrastructure for accepting card or mobile payments. The merchant device 203.2 may be in the form of a stationary computing device, such as a suitably programmed PC, which may be connected to a local area network 204 which is, in turn, connected to the Internet 202, as shown in FIG. 5. Alternatively, the merchant device 203.2 may be a smartphone similar to that described above for the client device 203.1, a tablet, or any other suitable computing device. It is not essential for the merchant device 203.2 to have any geolocation capability, although this may be used in some implementations, if available. For the purpose of this example, it will be assumed that the merchant device 203.2 is located in a place of business of the merchant.

In this example, the system includes an application server 201.1 which may be configured to send and receive information to and from client devices 203.1, 203.2 to facilitate the payment process. The client devices 203.1, 203.2 will usually be connected to the application server 201.1 via the Internet 202. The application server 201.1 may include a database 211 for storing merchant details and merchant geolocations for a plurality of participating merchants.

The application server 201.1 will be configured to receive the geolocation of the client device 203.1, determine the merchant identifier on this basis, and return the merchant details based on the merchant identifier to the client device 203.1 to allow the customer to authorize a payment to the merchant. The application server 201.1 may be configured to provide merchant identifiers of multiple merchants to the client device 203.1 if the merchant identifier cannot be definitively determined based on the geolocation of the client device 203.1, and to receive a selection of the merchant from the client device 203.1. The application server 201.1 will also be configured to receive, from the client device 203.1, a payment authorization including an indication of the customer's selected payment instrument and payment amount. In addition, the application server 201.1 will be configured to provide payment notifications to client devices 203.1 depending on the success or failure of payments. The application server 201.1 may also be configured to send/receive other information to/from the client devices 203.1, 203.2 of customers or merchants, such as for the registration of new customers or merchants or to enable ongoing configuration changes by the customers or merchants.

The application software executed by each client device 203.1, 203.2 will typically be configured to facilitate these and other information transfers. The customer or merchant may interact with the application server via a GUI (Graphical User Interface), or the like, presented on their respective processing systems 203.1, 203.2, such as via the application software or optionally via a browser application that displays webpages hosted by the application server 201.1.

Depending on the payment instrument being used, the application server 201.1 may communicate with a separate payment server 201.2 operated by a payment service provider, or the like, to actually cause the payment to be performed. This communication will typically also be achieved via the Internet 202. The payment server may in turn communicate with a payment network to perform the payment, in a generally conventional manner.

However, it will be appreciated that the above described configuration assumed for the purpose of the following examples is not essential, and numerous other configurations may be used. It will also be appreciated that the partitioning of functionality between the processing systems 201, 203 may vary, depending on the particular implementation.

Figure 6A:
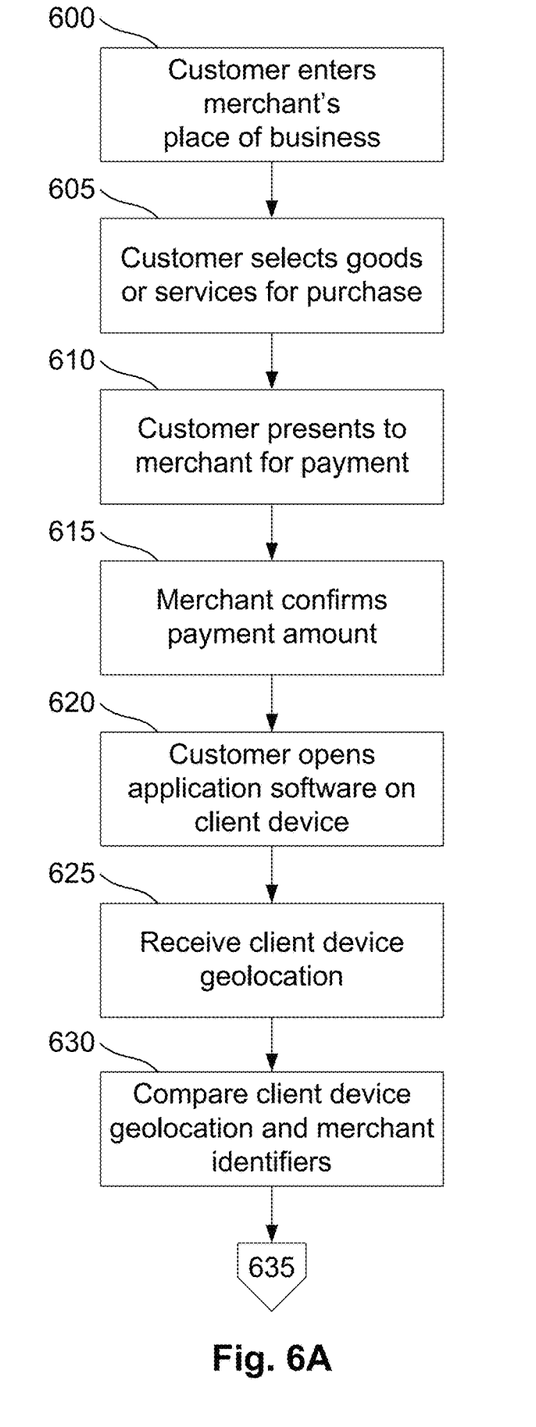
FIGS. 6A to 6C are a flow chart of an example of a method of a customer making a payment to a merchant.
Figure 6B:
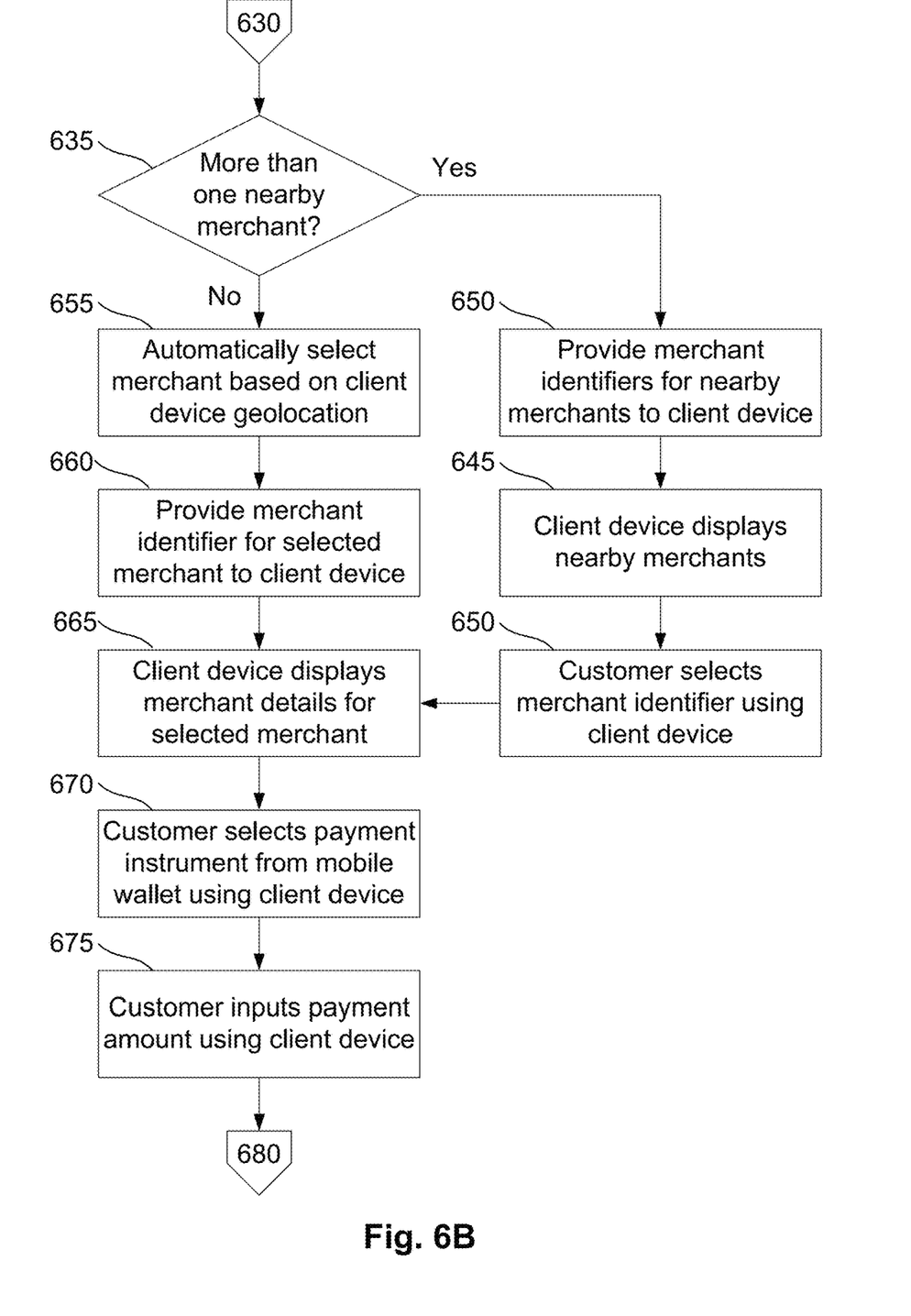
Figure 6C:
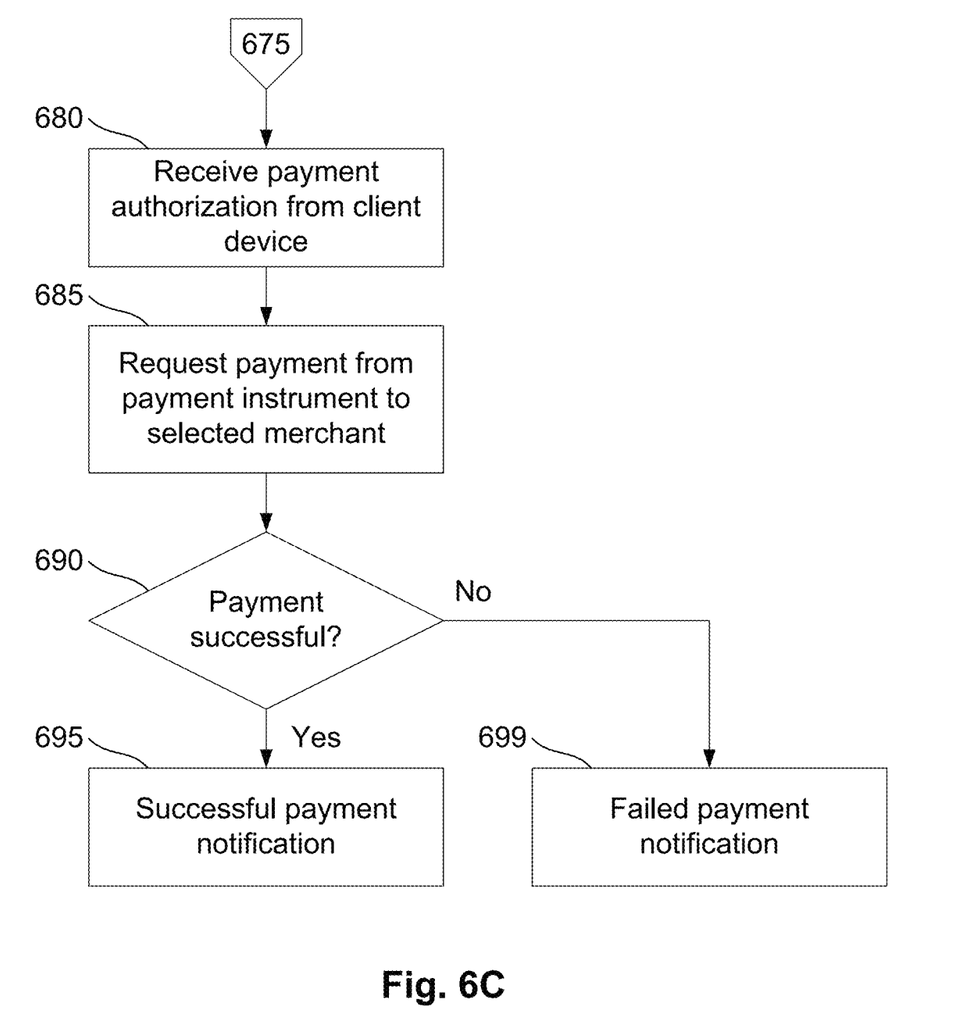

A detailed example of a method of a customer making a payment to a merchant using the above discussed techniques will now be described with regard to the flow chart of FIGS. 6A to 6C.

This example assumes that the customer's client device 203.1 is a smartphone having a geolocation capability and a data plan for consumption of mobile data and having a suitable version of the application software for facilitating the process installed, as discussed above. The customer is assumed to be already registered as a user of the application software, and is also assumed to have a mobile wallet containing one or more tokenized payment instruments (credit cards, debit cards, prepaid cards, and/or gift cards, for example) as mentioned earlier. Typically, when the customer initially registers as a user, the customer will set up the application software by connecting their tokenized mobile wallet to the application software in preparation for future payments.

This example also assumes that a merchant has already been registered with an acquiring bank to accept cashless payments. As part of the registration process, the merchant geolocation for the merchant's place of business will typically be provided to the application server 201.1 and stored in its database 211. The registration process may take place by having the merchant interact with a merchant device 203.2 to input required merchant details. A merchant identifier is subsequently associated with the merchant details. The geolocation may be obtained by having the merchant manually input an address of the merchant's place of business, or selecting the geolocation of the merchant's place of business on a digital map. Alternatively, if the merchant device 203.2 includes an in-built geolocation capability, such as a GPS receiver, the merchant device 203.2 may provide a determined merchant geolocation to the application server 201.1. The merchant may be given an opportunity to confirm the geolocation determined in this manner, which may be required in the event of a weak GPS signal or if the merchant is attempting to register using a mobile device that is not currently located in the merchant's place of business. However, in alternative examples, the merchant may be able to register with an acquiring bank without using a merchant device 203.2, such as by registering in person at a branch of the acquiring bank. In any event, the merchant identifier, the merchant details and the merchant geolocation will be stored in the database 211 of the application server 201.1 and thus available for use in the method.

In step 600, the customer enters the merchant's place of business, and selects goods or services for purchase in step 605. The customer presents to the merchant for payment in step 610. The merchant may process the customer's order of goods or services in a generally conventional manner, depending on the nature of the merchant's business. For instance, the merchant may process the customer's order using a suitably configured register if available, or may simply calculate a total payment amount for the order using a calculator or by manual calculations.

In any event, the merchant will confirm a payment amount required from the customer at step 615. The payment amount may be confirmed to the customer verbally or displayed on a register, or the like. Upon confirmation of the payment amount, at step 620, the customer will open the application software on their client device 203.1 to initiate the payment process. Typically, when the application software is opened on the client device 203.1, the application software will interface with a geolocation module of the client device 203.1 to determine the client device geolocation. The client device geolocation can then be transferred to the application server 201.1.

After receiving the client device geolocation at step 625, the application server 201.1 will then, at step 630, compare the client device geolocation with a plurality of respective merchant identifiers for a plurality of merchants. The comparison may be performed for only a subset of merchant identifiers which may be filtered based on a general geographical region, such as a city, suburb or locality. In this example, the comparison is used to determine whether there are any nearby merchants based on the client device geolocation. This may involve determining whether the client device geolocation is within a distance threshold of any of the respective merchant geolocations. The distance threshold may be predetermined based on known geolocation accuracy parameters, and may be variable depending on the strength of a GPS signal of the client device 203.1, for example.

In step 635, the application server 201.1 will determine whether there is more than one merchant identifier which might potentially correspond to the client device geolocation. If there is more than one merchant identifier, the application server 201.1 will provide merchant identifiers for the multiple nearby merchants to the client device 203.1. These merchant details based on the merchant identifiers will be accessed from the database 211 based on the respective merchant geolocations for which the client device geolocation was within the distance threshold.

At step 645 the client device 203.1 may display the nearby merchants to the customer via the application software. This may involve providing a list of the merchant identifiers or alternatively may depict the merchant geolocations relative to the determined client device geolocation on a mapping interface. In any event, the customer can make a selection of one of the multiple nearby merchants at step 650, to ensure the payment will be made in favour of the correct merchant. The client device 203.1 can then display the merchant details for the selected merchant identifier to the customer.

Alternatively, if the application server 201.1 determines at step 635 that there is only a single nearby merchant (e.g., if the client device geolocation is only within the distance threshold of one merchant geolocation), then, at step 655, the application server 201.1 may automatically select the merchant identifier based on the client device geolocation without requiring a selection by the customer. Accordingly, at step 660 the merchant details for the selected merchant can be provided to the client device 203.1, to allow the client device 203.1 to display the merchant details for the selected merchant at step 665.

In any case, the customer will have an opportunity to verify the merchant details displayed on the client device 203.1 before allowing the payment to proceed further. Assuming the customer agrees to proceed with the payment to the merchant corresponding to the displayed merchant details, the customer may then commence authorization of the payment.

In step 670, the customer may select a payment instrument, such as a credit/debit card, bank account, gift card, or the like, from the mobile wallet on the client device 203.1. In the event that the customer has multiple payment instruments in their mobile wallet, this may involve the client device 203.1 displaying indications of each available payment instrument and having the customer manually select one of these using the client device 203.1. Alternatively, if only one payment instrument is available, the customer may simply input their confirmation to proceed with a payment based on that payment instrument.

Next, in step 675, the customer will input the payment amount (previously confirmed by the merchant in step 615) using the client device 203.1. This may simply involve the customer entering the payment amount using a numerical keypad interface of the client device 203.1.

When the customer has confirmed the merchant identifier, selected a desired payment instrument for the payment, and has input the payment amount, the payment may be authorized. This may require the customer to participate in a further authentication step, such as entering a password or personal identification number, or using biometric authentication, such as by scanning the customer's fingerprint. In some implementations, two-factor authentication techniques may be used. In any event, once the payment has been authorized, the client device 203.1 will provide a payment authorization to the application server 201.1.

Upon receipt of the payment authorization at step 680, the application server 201.1 may then proceed to cause the payment to be performed. In this example, at step 685 the application server 201.1 communicates with a payment server 201.2 to request payment from the customer's selected payment instrument to the selected merchant's account with their acquiring bank. This may involve the application server 201.1 generating a suitable payment request message in a suitable format for providing to the payment server 201.2, to allow the payment server to perform the payment on a conventional payment network.

In step 690, the application server 201.1 will determine whether the payment has been successfully performed, typically based on a message returned from the payment server 201.2. In the event of a successful payment, a successful payment notification may be generated at step 695. This successful payment notification may be provided to the client device 203.1 and/or the merchant device 203.2 depending on the implementation. In the case of the client device 203.1, the successful payment notification may be provided via the application software to provide a seamless confirmation that the customer's payment to the merchant has been processed to completion. In some implementations, the merchant may request to view the successful payment notification on the customer's client device 203.1, and this may be adequate confirmation of the payment for the merchant to release the goods and services to the customer.

However, in some examples, the merchant may wish to receive their own verification of the payment, and therefore a successful payment notification may also be provided to the merchant via the merchant device 203.2. The nature of the successful payment notification provided to the merchant device 203.2 can vary depending on requirements. In some cases, the merchant device 203.2 may also execute application software for communication with the application server 201.1, and the successful payment notification may take the form of a push notification provided by the application software. However, it is not essential for the merchant device 203.2 to execute application software, and in other examples, the merchant device 203.2 may receive the successful payment notification via any suitable messaging service, such as short message service (SMS) or email. Accordingly, the merchant may be able to receive a successful payment notification using a range of possible types of merchant devices 203.2.

If the payment is unsuccessful, the application server 201.1 would instead, at step 699, provide a failed payment notification to the client device 203.1 and/or the merchant device 203.2 in a similar manner as discussed for the successful payment notification. In this case, the customer and the merchant may agree to cancel the transaction or the customer may make another payment attempt, such as by using an alternative payment instrument. The failed payment notification may include an indication of why the payment was unsuccessful to allow the customer to modify their next payment attempt accordingly.

Despite the option for providing a payment notification to a merchant device 203.2, it should be appreciated that it is not essential for the merchant to have a merchant device 203.2 to facilitate the payment, as the merchant device 203.2 is only used for providing a confirmation of success or failure of the payment, which could otherwise be received via the client device 203.1 only.

In any event, in view of the above examples, it will be appreciated that the methods and systems described above facilitate cashless payments from customers to merchants that do not have card acquiring infrastructures. In fact, the merchant does not require a POS terminal or even a merchant device to enable the payment, which can be completed entirely through customer interactions with the client device 203.1. This provides a means for merchant's to accept cashless payments even if they cannot afford a supporting infrastructure.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the disclosure broadly appearing before described.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for facilitating a payment from a customer to a merchant, the method comprising:
   receiving, by a backend computing device, from a client device of a customer, a client device geolocation;
   in response to receiving the client device geolocation, accessing, by the backend computing device, a data structure, the data structure including a plurality of merchants, wherein the backend computing device is separate and distinct from each of the plurality of merchants and wherein, for each of the plurality of merchants, the data structure includes a merchant geolocation, a merchant identifier, and merchant details;

selecting, by the backend computing device, from the data structure, the merchant identifier for one of the plurality of merchants based on the client device geolocation being in closest proximity to the merchant geolocation of the one of the plurality of merchants, thereby indicating that the customer is at or near a location of the one of the plurality of merchants;

after the merchant identifier for the one of the plurality of merchants is selected, determining, by the backend computing device, from the data structure, the merchant details for the one of the plurality of merchants based on the selected merchant identifier of the one of the plurality of merchants;

providing, by the backend computing device, to the client device, the determined merchant details;

after providing the determined merchant details to the client device, receiving, by the backend computing device, from the client device, apart and independent from a cashless payment infrastructure of the one of the plurality of merchants, a payment authorization for the one of the plurality of merchants for purchase of at least one product at the location of the one of the plurality of merchants, the payment authorization including:
an indication of a payment instrument of the customer; and
a payment amount for a payment to the one of the plurality of merchants; and in response to the payment authorization, causing, by the backend computing device, the payment from the payment instrument of the customer to the one of the plurality of merchants to be performed, apart and independent from the cashless payment infrastructure of the one of the plurality of merchants.

2. The method according to claim 1, wherein selecting the merchant identifier for the one of the plurality of merchants includes comparing the client device geolocation to the merchant geolocations for the plurality of merchants in the data structure.

3. The method according to claim 2, wherein selecting the merchant identifier for the one of the plurality of merchants further includes determining that the merchant geolocation of the one of the plurality of merchants is closest by distance to the client device geolocation based on the comparison of the client device geolocation to the merchant geolocations for the plurality of merchants.

4. The method according to claim 2, wherein comparing the client device geolocation to the merchant geolocations for the plurality of merchants includes determining whether the client device geolocation is within a distance threshold of the merchant geolocations for the plurality of merchants.

5. The method according to claim 4, wherein selecting the merchant identifier for the one of the plurality of merchants includes, when the client device geolocation is within the distance threshold of the merchant location of more than one of the plurality of merchants:
providing, to the client device, the merchant details for the more than one of the plurality of merchants; and
receiving, from the client device, the selected merchant identifier from the merchant details for the more than one of the plurality of merchants.

6. The method according to claim 4, wherein the selected merchant identifier includes the merchant identifier of the one of the plurality of merchants when the client device geolocation is within the distance threshold of the merchant location of only the one of the plurality of merchants.

7. The method according to claim 1, wherein the merchant details for each of the plurality of merchants include at least an identity of the merchant to thereby allow the customer to confirm the identity of the merchant before authorizing the payment.

8. The method according to claim 1, further comprising receiving the payment authorization in response to manual input by the customer using the client device.

9. The method according to claim 8, further comprising manually inputting, by the customer, a selection of the payment instrument from a plurality of available payment instruments.

10. The method according to claim 8, further comprising manually inputting, by the customer, the payment amount using the client device.

11. The method according to claim 10, further comprising confirming, by the one of the plurality of merchants, the payment amount to the customer prior to the customer manually inputting the payment amount.

12. The method according to claim 1, wherein causing the payment to be performed includes:
determining a customer account based on the indication of the payment instrument;
determining a merchant account based on the selected merchant identifier for the one of the plurality of merchants; and
causing the customer account to be debited and the merchant account to be credited in accordance with the payment authorization.

13. The method according to claim 1, wherein causing the payment to be performed includes generating a payment request message and providing the payment request message to a payment server.

14. The method according to claim 1, further comprising, in response to a successful payment, providing a successful payment notification to a device of the one of the plurality of merchants.

15. The method according to claim 14, further comprising generating the successful payment notification with a unique reference to allow the one of the plurality of merchants to confirm that the payment has been received from the customer.

16. The method according to claim 1, further comprising communicating, by the backend computing device, with the client device using a communication network.

17. A system for facilitating a payment from a customer to a merchant, the system comprising:
a data structure including a plurality of merchants and, for each of the plurality of merchants, a merchant identifier, a merchant geolocation, and merchant details; and
a backend electronic processing device separate and distinct from each of the plurality of merchants, the backend electronic processing device configured to:
receive, from a client device of the customer, a client device geolocation;
determine, from the data structure, the merchant identifier for one of the plurality of merchants based on the client device geolocation being in closest proximity to the merchant geolocation of the one of the plurality of merchants, thereby indicating that the customer is at or near a location of the one of the plurality of merchants;
after determining the merchant identifier of the one of the plurality of merchants, retrieve from the data structure and provide, to the client device, the merchant details for the one of the plurality of merchants based on the determined merchant identifier;

receive, from the client device, apart and independent from a cashless payment infrastructure of the one of the plurality of merchants, a payment authorization for the one of the plurality of merchants for purchase of at least one product at the location of the one of the plurality of merchants, the payment authorization including:
- an indication of a payment instrument of the customer; and
- a payment amount for a payment to the one of the plurality of merchants; and in response to the payment authorization, cause the payment from the payment instrument of the customer to the one of the plurality of merchants to be performed, apart and independent from the cashless payment infrastructure of the one of the plurality of merchants.

18. The system of claim 17, further comprising the client device, the client device configured to:
- determine the client device geolocation;
- provide, to the backend electronic processing device, the client device geolocation whereby the backend electronic processing device determines the merchant identifier of the one of the plurality of merchants based on the client device geolocation;
- receive, from the backend electronic processing device, the merchant details for the one of the plurality of merchants; and
- provide, to the backend electronic processing device, the payment authorization for the one of the plurality of merchants.

* * * * *